Patented Jan. 29, 1952

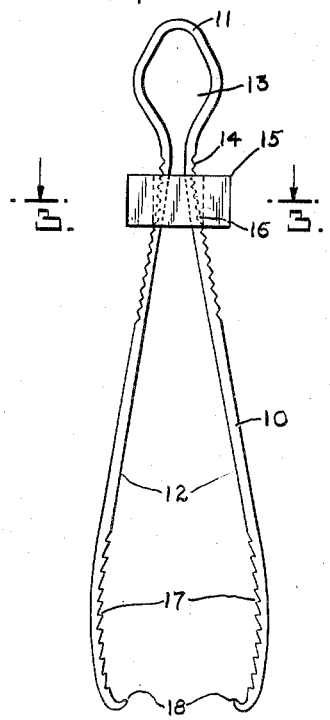
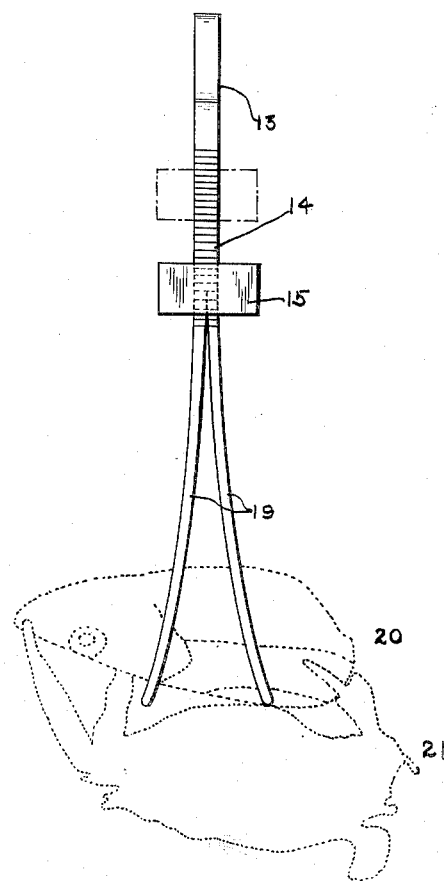
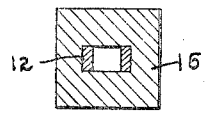

2,583,680

UNITED STATES PATENT OFFICE 2,583,680

LURE HOLDER FOR FISHERMEN

Frank Brennan, Elizabeth, N. J.

Application April 7, 1950, Serial No. 154,519

1 Claim. (Cl. 24—260)

This invention relates to a lure holder for fishermen.

It is an object of this invention to provide a holder or clamp by which a sizeable piece of bait may be firmly clamped, so that fish may feed from it without being able to take it away.

The device may be used in any customary manner to lure fish, but it is particularly useful in luring crabs to a point where they may be caught in a net or trap.

It is a further object to provide a device of the character described which will itself serve as a sinker to assist in holding the lure at the point desired.

It is a further object to provide a holder which may be readily clamped and unclamped, but which when clamped will firmly hold the bait against dislodgment.

The invention accordingly comprises a device possessing the features, properties and the relation of elements which will be exemplified in the device hereinafter described and the scope of the application of which will be indicated in the claims.

For a fuller understanding of the nature and objects of the invention, reference should be had to the following detailed description taken in connection with the accompanying drawings, in which:

Fig. 1 is a side elevation thereof;

Fig. 2 is a front elevation; and

Fig. 3 is a section on the line 3—3 of Fig. 1.

The device comprises primarily a spring shaped member 10 bent back upon itself at 11 to form two generally parallel grasping arms 12. The portion at the bend 11 is enlarged to form an eye 13 and just below the eye each of the arms 12 is provided with a series of notches upon its outer surface, as shown at 14. A block or clamp member 15 embraces both arms at the notched portion referred to and itself contains notches on its inner surface, as shown at 16, to engage the notches upon the arms.

The set of the spring member is such that the arms are urged by the spring action open to the maximum required and are held in clamped position by the sliding of the block 15 downwardly over the notches, while the arms are held together firmly against the bait. At its outer or lower end, each of the arms is curved inwardly and is provided on its inner surface with a series of teeth 17, preferably terminating at an inwardly bent hook 18.

In use, the holder which is normally open, is caused to embrace the bait, the arms being then pressed tightly together and the block 15 is slid down to the maximum, where the teeth 17 firmly grasp the bait and hold it in place. In Fig. 2 the device is shown in this condition and there is also shown in dotted lines, at 20, a fish head upon which a crab 21 is feeding. As shown in this figure, each of the arms 12 is bifurcated as shown at 19 and the portions are spread apart in order more clearly to grasp the bait.

In using this device a suitable cord may be attached through the eye 13 and thereafter the holder with the bait included is lowered to the point desired. It will normally stay at the point indicated by reason of the weight of the device and of the block 15. Dependent upon the nature of the fishing to be done, it may be lowered clear to the bottom or may be held in an intermediate position, at the will of the operator.

The clamp here shown is useful for more purposes, however, and because of its capacity to firmly grasp the fish in spite of its slipperiness, it may be used as a clamp to hold a fish while the scales are being removed. It will be obvious, moreover, that if desired a live fish may be grasped with the holder and transferred from one tank to another without damaging the fish and without danger of escape.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claim is intended to cover all of the generic and specific features of the invention herein described, and all statements of the scope of the invention which as a matter of language might be said to fall therebetween.

I claim:

A lure holder for fishermen comprising a spring strip bent back upon itself to form an eye and divergent arms extending from said eye, each arm having its free end bifurcated to form divergent fingers, the fingers of each arm being curved toward the fingers of the other arm and being provided with teeth on its inner face of the curve pointed upwardly, a block having a central opening embracing the arms, and said block and arms having mating teeth, and each of said arms having its ends pointed inwardly and upwardly to prevent a bait from slipping out, and said block being made heavy to assist in sinking a bait in water.

FRANK BRENNAN.

REFERENCES CITED

The following references are of record in the file of this patent:

UNITED STATES PATENTS

| Number | Name | Date |
| --- | --- | --- |
| 72,776 | Badger | Dec. 31, 1867 |
| 718,273 | McLellan | Jan. 13, 1903 |
| 776,555 | Settle | Dec. 6, 1904 |
| 880,299 | Gromer | Feb. 25, 1908 |
| 1,135,338 | Vecsey | Aug. 13, 1915 |
| 1,513,099 | Fox | Oct. 28, 1924 |